(12) United States Patent
Junee et al.

(10) Patent No.: US 8,826,117 B1
(45) Date of Patent: Sep. 2, 2014

(54) WEB-BASED SYSTEM FOR VIDEO EDITING

(75) Inventors: Ryan Junee, Mountain View, CA (US); Simon Ratner, Mountain View, CA (US); Julian Frumar, Mountain View, CA (US)

(73) Assignee: Google Inc., Mountain View, CA (US)

( * ) Notice: Subject to any disclaimer, the term of this patent is extended or adjusted under 35 U.S.C. 154(b) by 255 days.

(21) Appl. No.: 12/411,162

(22) Filed: Mar. 25, 2009

(51) Int. Cl.
*G06F 17/00* (2006.01)

(52) U.S. Cl.
USPC ............................. 715/230; 715/704; 715/716

(58) Field of Classification Search
USPC .............................. 715/704, 716, 230; 725/40
See application file for complete search history.

(56) References Cited

U.S. PATENT DOCUMENTS

| | | | | |
|---|---|---|---|---|
| 5,339,393 A | * | 8/1994 | Duffy et al. | 715/723 |
| 5,388,197 A | * | 2/1995 | Rayner | 715/723 |
| 5,414,806 A | | 5/1995 | Richards | |
| 5,530,861 A | | 6/1996 | Diamant et al. | |
| 5,600,775 A | | 2/1997 | King et al. | |
| 5,664,216 A | * | 9/1997 | Blumenau | 715/234 |
| 5,708,845 A | | 1/1998 | Wistendahl et al. | |
| 5,732,184 A | * | 3/1998 | Chao et al. | 386/282 |
| 5,760,767 A | | 6/1998 | Shore et al. | |
| 5,781,188 A | | 7/1998 | Amiot et al. | |
| 5,812,642 A | | 9/1998 | Leroy | |
| 5,966,121 A | | 10/1999 | Hubbell et al. | |
| 6,006,241 A | * | 12/1999 | Purnaveja et al. | 715/205 |
| 6,262,732 B1 | | 7/2001 | Coleman et al. | |
| 6,289,346 B1 | | 9/2001 | Milewski et al. | |
| 6,295,092 B1 | | 9/2001 | Hullinger et al. | |
| 6,415,438 B1 | | 7/2002 | Blackketter et al. | |
| 6,570,587 B1 | | 5/2003 | Efrat et al. | |

(Continued)

FOREIGN PATENT DOCUMENTS

| | | |
|---|---|---|
| JP | 2004-080769 | 3/2004 |
| JP | 2006-157689 | 6/2006 |

(Continued)

OTHER PUBLICATIONS

Ronald Schroeter, Jane Hunter, Douglas Kosovic; Vannotea—A Collaborative Video Indexing, Annotation and Discussion System for Broadband Networks; Knowledge capture, 2003; pp. 1-8.*

(Continued)

*Primary Examiner* — Doug Hutton, Jr.
*Assistant Examiner* — Brian Garmon
(74) *Attorney, Agent, or Firm* — Fenwick & West LLP

(57) ABSTRACT

Disclosed are web-based systems and methods for editing digital videos. A graphical editing interface allows designating one or more videos to assemble into a video compilation. The graphical editing interface further allows specifying the portion of a constituent video of the video compilation that will be displayed when the video compilation is played. The graphical editing interface additionally allows the association of annotations—specifying, for example, slides, people, and highlights—with portions of the video. The associated annotations alter the appearance of the video compilation when it is played, such as by displaying slides, or text associated with the annotations, along with the video at times associated with the annotations. The associated annotations also enhance the interactivity of the video compilation, such as by allowing playback to begin at points of interest, such as portions of the video for which there is an associated annotation. The associated annotations can be created by selection of annotation tools of the graphical editing interface, where at least one of the annotation tools is created responsive to a user providing information associated with the tool.

10 Claims, 11 Drawing Sheets

(56) References Cited

U.S. PATENT DOCUMENTS

| | | | |
|---|---|---|---|
| 6,774,908 B2 | 8/2004 | Bates et al. |
| 6,792,618 B1 | 9/2004 | Bendinelli et al. |
| 6,917,965 B2 | 7/2005 | Gupta et al. |
| 6,956,593 B1 | 10/2005 | Gupta et al. |
| 6,993,347 B2 | 1/2006 | Bodin et al. |
| 7,032,178 B1 | 4/2006 | McKnight et al. |
| 7,055,168 B1 | 5/2006 | Errico et al. |
| 7,131,059 B2 | 10/2006 | Obrador |
| 7,137,062 B2 | 11/2006 | Kaufman et al. |
| 7,149,755 B2 | 12/2006 | Obrador |
| 7,207,006 B1 | 4/2007 | Feig et al. |
| 7,254,605 B1 | 8/2007 | Strum |
| 7,383,497 B2 | 6/2008 | Glenner et al. |
| 7,418,656 B1 | 8/2008 | Petersen |
| 7,559,017 B2 | 7/2009 | Datar et al. |
| 7,599,950 B2 | 10/2009 | Walther et al. |
| 7,636,883 B2 | 12/2009 | Albornoz et al. |
| 7,724,277 B2 | 5/2010 | Shingu et al. |
| 7,761,436 B2 | 7/2010 | Norton et al. |
| 7,805,678 B1 | 9/2010 | Niles et al. |
| 8,202,167 B2 | 6/2012 | Ackley et al. |
| 8,209,223 B2 | 6/2012 | Fink et al. |
| 8,280,827 B2 | 10/2012 | Muller et al. |
| 8,392,834 B2 | 3/2013 | Obrador |
| 2001/0023436 A1 | 9/2001 | Srinivasan et al. |
| 2002/0059218 A1 | 5/2002 | August et al. |
| 2002/0059584 A1 | 5/2002 | Ferman et al. |
| 2002/0065678 A1 | 5/2002 | Peliotis et al. |
| 2002/0069218 A1 | 6/2002 | Sull et al. |
| 2002/0078092 A1 | 6/2002 | Kim |
| 2002/0120925 A1 | 8/2002 | Logan |
| 2002/0188630 A1 | 12/2002 | Davis |
| 2003/0002851 A1* | 1/2003 | Hsiao et al. ............... 386/52 |
| 2003/0018668 A1 | 1/2003 | Britton et al. |
| 2003/0039469 A1 | 2/2003 | Kim |
| 2003/0068046 A1 | 4/2003 | Lindqvist et al. |
| 2003/0093790 A1 | 5/2003 | Logan et al. |
| 2003/0107592 A1 | 6/2003 | Li et al. |
| 2003/0112276 A1 | 6/2003 | Lau et al. |
| 2003/0196164 A1 | 10/2003 | Gupta et al. |
| 2003/0231198 A1* | 12/2003 | Janevski ............... 345/704 |
| 2004/0021685 A1 | 2/2004 | Denoue et al. |
| 2004/0125133 A1 | 7/2004 | Pea et al. |
| 2004/0138946 A1 | 7/2004 | Stolze |
| 2004/0168118 A1 | 8/2004 | Wong et al. |
| 2004/0172593 A1 | 9/2004 | Wong et al. |
| 2004/0205482 A1 | 10/2004 | Basu et al. |
| 2005/0044254 A1 | 2/2005 | Smith |
| 2005/0081159 A1 | 4/2005 | Gupta et al. |
| 2005/0160113 A1 | 7/2005 | Sipusic et al. |
| 2005/0203876 A1 | 9/2005 | Cragun et al. |
| 2005/0203892 A1 | 9/2005 | Wesley et al. |
| 2005/0275716 A1 | 12/2005 | Shingu et al. |
| 2005/0289469 A1 | 12/2005 | Chandler et al. |
| 2006/0041564 A1 | 2/2006 | Jain et al. |
| 2006/0053365 A1 | 3/2006 | Hollander et al. |
| 2006/0059426 A1 | 3/2006 | Ogikubo |
| 2006/0064733 A1 | 3/2006 | Norton et al. |
| 2006/0087987 A1 | 4/2006 | Witt et al. |
| 2006/0101328 A1 | 5/2006 | Albornoz et al. |
| 2006/0200832 A1 | 9/2006 | Dutton |
| 2006/0286536 A1 | 12/2006 | Mohler |
| 2006/0294085 A1 | 12/2006 | Rose et al. |
| 2006/0294134 A1 | 12/2006 | Berkhim et al. |
| 2007/0002946 A1 | 1/2007 | Bouton et al. |
| 2007/0038610 A1 | 2/2007 | Omoigui |
| 2007/0099684 A1 | 5/2007 | Butterworth |
| 2007/0121144 A1 | 5/2007 | Kato |
| 2007/0162568 A1 | 7/2007 | Gupta et al. |
| 2007/0174774 A1 | 7/2007 | Lerman et al. |
| 2007/0240072 A1 | 10/2007 | Cunningham et al. |
| 2007/0250901 A1 | 10/2007 | McIntire et al. |
| 2007/0266304 A1 | 11/2007 | Fletcher et al. |
| 2008/0005064 A1 | 1/2008 | Sarukkai |
| 2008/0016245 A1 | 1/2008 | Cunningham et al. |
| 2008/0028294 A1 | 1/2008 | Sell et al. |
| 2008/0046458 A1 | 2/2008 | Tseng et al. |
| 2008/0086742 A1 | 4/2008 | Aldrey |
| 2008/0091723 A1 | 4/2008 | Zuckerberg et al. |
| 2008/0168070 A1 | 7/2008 | Naphade et al. |
| 2008/0168073 A1 | 7/2008 | Siegel et al. |
| 2008/0250331 A1 | 10/2008 | Tulshibagwale |
| 2008/0284910 A1 | 11/2008 | Erskine et al. |
| 2009/0064005 A1 | 3/2009 | Cunningham et al. |
| 2009/0165128 A1 | 6/2009 | McNally et al. |
| 2009/0199251 A1 | 8/2009 | Badoiu et al. |
| 2009/0204882 A1 | 8/2009 | Hollander et al. |
| 2009/0210779 A1 | 8/2009 | Badoiu et al. |
| 2009/0249185 A1 | 10/2009 | Datar et al. |
| 2009/0297118 A1 | 12/2009 | Fink et al. |
| 2009/0300475 A1 | 12/2009 | Fink et al. |
| 2010/0169927 A1 | 7/2010 | Yamaoka et al. |
| 2013/0042179 A1 | 2/2013 | Cormack et al. |

FOREIGN PATENT DOCUMENTS

| | | |
|---|---|---|
| JP | 2006155384 A | 6/2006 |
| JP | 2007-151057 | 6/2007 |
| JP | 2007-274090 | 10/2007 |
| JP | 2007-310833 | 11/2007 |
| KR | 2007-0004153 A1 | 1/2007 |
| WO | WO 2007082169 A2 * | 7/2007 |

OTHER PUBLICATIONS

Arman, F., et al., "Image Processing on Encoded Video Sequences", ACM Multimedia Systems Journal, pp. 211-219, vol. 1, No. 5, 1994.

Ford, R., et al., *Metrics for shot boundary detection in digital video sequences*, Multimedia Systems, Jan. 2000, pp. 37-46, vol. 8.

Gonzalez, N., "Video Ads: Every Startup Has a Different Solution," TechCrunch, Jul. 6, 2007, 7 Pages, [online] [Retrieved on Apr. 20, 2009] Retrieved from the internet <URL:http://www.techcrunch.com/2007/07/06/video-ads-somebody-needs-to-solve-this-problem/>.

Good, R., "Online Video Publishing Gets Into the Conversation: Click.TV," Robin Good, What Communication Experts Need to Know, Apr. 18, 2006, 10 pages, [online] [retrieved on Jan. 16, 2007] Retrieved from the Internet: <URL: http://www.masternewmedia.org/news/2006/04/18/online_video_publishing_gets_into.html>.

Mikolajczyk, K. et al., "A Performance Evaluation of Local Descriptors", IEEE Transactions on Pattern Analysis and Machine Intelligence, Oct. 2005, vol. 27, No. 10, pp. 1615-1630, 16 pages.

Moenne-Loccoz, N., et al., "Managing Video Collections at Large," CUDB '04: Proceedings of the 1st International Workshop on Computer Vision Meets Database, Jun. 2004, pp. 59-66.

Naphade, M.R., et al., "A High Performance Shot Boundary Detection Algorithm using Multiple Cues", 1998 International Conference on Image Processing, pp. 884-887, Oct. 4-7, 1988, Chicago, IL, USA.

Tjondronegoro, D., et al., "Content-Based Video Indexing for Sports Applications Using Integrated Multi-Modal Approach," Multimedia '05: Proceedings of the 13th Annual ACM International Conference on Multimedia, Nov. 2005, p. 1035-1036.

Zabih, R., et al., "A Feature-Based Algorithm for Detecting and Classifying Scene Breaks", Proc. ACM Multimedia 95, pp. 189-200, Nov. 1993, San Francisco, CA.

"Ticket #3504 (new enhancement)," Participatory Culture Foundation, Software Development, Aug. 14, 2006, 1 page, [online] [retrieved on Jan. 16, 2007] Retrieved from the Internet: <URL: https://develop.participatoryculture.org/trac/democracy/ticket/3504>.

"Video Marketing, Video Editing & Hosting, Interactive Video," Veeple.com, 2009, 1 page, [online] [Retrieved on Apr. 20, 2009] Retrieved from the internet <URL:http://www.veeple.com/interactivity.php>.

"More on Mojiti," bavatuesdays.com, Mar. 23, 2007, 4 pages, [online] [Retrieved on Apr. 20, 2009] Retrieved from the internet <URL:http://bavatuesdays.com/more-on-mojiti/>.

"BubblePLY," PLYmedia Inc. 2008, 1 page, [online] [Retrieved on Apr. 20, 2009] Retrieved from the internet URL:http://www.plymedia.com/products/bubbleply/bubbleply.aspx>.

(56) References Cited

OTHER PUBLICATIONS

"Ooyala—Interactive Video Advertising," Ooyala, Inc. 2009, 1 page, [online] [Retrieved on Apr. 20, 2009] Retrieved from the internet <URL:http://www.ooyala.com/products/ivideo>.
MirriAd, 2008, 1 page, [online] [Retrieved on Apr. 20, 2009] Retrieved from the internet <URL:http://www.mirriad.com>.
Screenshot of "Remixer", YouTube.com, May 2007 to Feb. 2008, 1 page.
Korean Intellectual Property Office Notice of Preliminary Rejection, Korean Patent Application No. 10-2009-7015068, Feb. 5, 2010, 12 pages.
Korean Intellectual Property Office Notice of Preliminary Rejection, Korean Patent Application No. 10-2009-7015068, Oct. 5, 2009, 4 pages.
PCT International Search Report and Written Opinion, PCT/US2009/034422, Oct. 6, 2009, 12 Pages.
PCT International Search Report and Written Opinion, PCT/US2007/088067, Jul. 21, 2008, 13 pages.
PCT International Search Report and Written Opinion, PCT/US2009/042919, Jun. 17, 2009, 8 pages.
PCT International Search Report and Written Opinion, PCT/US2009/033475, Aug. 20, 2009, 7 Pages.
Screenshot of "Interactive Video Demo—Check out the Yelp / AdSense demo," Ooyala, Inc. 2009, 1 page, [online] [Retrieved on Apr. 23, 2009] Can be retrieved from the internet <URL:http://www.ooyala.com/products/ivideo>.
Examiner's first report on Australian Patent Application No. AU 2010249316, Mailed Jun. 20, 2011, 3 Pages.
Office Action mailed May 2, 2011, for U.S. Appl. No. 12/389,359, 12 pages.
First Office Action for Chinese Patent Application No. CN 200980108230.7 mailed Feb. 28, 2012, 11 Pages.
Rejection Decision for Chinese Patent Application No. CN 200780050525.4 mailed Jan. 18, 2012, 23 Pages.
Supplementary European Search Report for European Patent Application No. EP 07865849, May 18, 2012, 7 Pages.
Gasi Y et al: "Sharing video annotations", Image Processing, 2004. ICIP '04. 2004 International Conference on Singapore Oct. 24-27, 2004, Piscataway, NJ, USA, IEEE, vol. 4, Oct. 24, 2004, pp. 2227-2230.
Andrew S. Gordon: "Using annotated video as an information retrieval interface," Proceedings of the 5th International Conference on Intelligent User Interfaces, IUI '00, Jan. 1, 2000, pp. 133-140.
United States Office Action, U.S. Appl. No. 13/250,998, May 25, 2012, 12 pages.
United States Office Action, U.S. Appl. No. 13/371,321, May 25, 2012, 12 pages.
Chinese Second Office Action, Chinese Application No. 200980108230.7, Aug. 13, 2012, 11 pages.
Chinese Office Action, Chinese Application No. 200910206036.4, Sep. 18, 2012, 19 pages.
European Extended Search Report, European Application No. 09709327.2, Sep. 21, 2012, 7 pages.
Notification of Second Board Opinion for Chinese Patent Application No. CN 200780050525.4, Dec. 26, 2013, 5 Pages.
Extended European Search Report for European Patent Application No. EP 09711777, Dec. 12, 2012, 16 Pages.
Miyamori, H., et al: "Generation of views of TV content using TV viewers' perspectives expressed in live chats on the web", Proceedings of the 13th Annual ACM International Conference on Multimedia, Multimedia '05, Nov. 6, 2005, p. 853-861.
Office Action for Canadian Patent Application No. CA 2,726,777, Nov. 26, 2012, 3 Pages.
Office Action for Canadian Patent Application No. CA 2,672,757, Mar. 21, 2013, 5 Pages.
Office Action for Japanese Patent Application No. P2010-546967, Apr. 23, 2013, 5 Pages.
Notification of Reexamination Board Opinion for Chinese Patent Application No. 200780050525.4, Jun. 14, 2013, 11 Pages.
Communication pursuant to Article 94(3) for European Patent Application No. EP 09709327.2, Jan. 10, 2014, 6 Pages.
Screenshot for Zentation.com, 1 page, [online] [Retrieved on Jun. 26, 2009] Retrieved from the internet <URL:http://www.zentation.com/>.
Screenshot for Zentation.com, 1 page, [online] [Retrieved on Jun. 26, 2009] Retrieved from the internet <URL:http://www.zentation.com/viewer/index.php?passcode=epbcSNExIQr>.
Screenshot for Zentation.com, 1 page, [online] [Retrieved on Jun. 26, 2009] Retrieved from the internet <URL:http://www.zentation.com/viewer/setup.php?passcode=De2cwpjHsd>.
"New Feature: Link within a Video," Google Video Blog, Jul. 19, 2006, pp. 1-5, [online] [Retrieved on Jul. 18, 2008] Retrieved from the internet <URL:http://googlevideo.blogspot.com/2006/07/new-feature-link-within-video_19.html>.
"New commenting and stats features," Google Video Blog, Nov. 14, 2006, pp. 1-5, [online] [Retrieved on Jul. 18, 2008] Retrieved from the internet <URL:http://googlevideo.blogspot.com/2006/11/new-commenting-and-stats-features.html>.
"Online Media Bookmark Manager," Media X, pp. 1-2, [online] [Retrieved on Jul. 18, 2008] Retrieved from the internet <URL:http://mediax.stanford.edu/documents/bookmark.pdf>.
Screenshot of Veeple Labs—Interactive Video, 1 page, [online] [Retrieved on Jun. 9, 2008] Retrieved from the internet <URL:http://www.veeple.com/>.
Screenshot of "Interactive Video Demo—Check out the Yelp/AdSense demo," Ooyala, Inc. 2009, 1 page, [online] [Retrieved on Apr. 23, 2009] Can be retrieved from the internet <URL:http://www.ooyala.com/products/ivideo>.

\* cited by examiner omnisio

BROWSE    CHANNELS

✎ 1.Edit Video  ⧉ 2.Publish  3.Share

Feedback | About Us | cking | Logout

🔍 Search Omnisio   GO

CREATE YOUR OWN
↘NO SIGNUP!↙

Now online at: http://www.omnisio.com/v/xgoj9FldjhG/penguin-mashup    Copy

Share with your friends! Paste the code below into your Facebook Funwall or Myspace page, or simply click one of the sharing buttons Post  Bookmark  Email

| Facebook | MySpace | Hi5 | Bebo | LiveJournal |
| Blogger | Freindster | Orkut | iGoogle | Netvibes |
| Tagged | Live Spaces | Piczo | Freewebs | BlackPlanet |
| myYearbook | Vox | TypePad | Xanga | Multiply |
| Pageflakes | Yahoo | MiGente | Ameba | Livedoor |

Embed code:    Copy name='allowscriptaccess' value='always'/><param name='allowfullscreen' value='true'/><embed type='application/x-shockwave-flash' src="http://www.omnisio.com/bin/Embed.swf?embedID=aIgQOqfm4r3RKfadbiFy2w' bgcolor='#FFFFFF' quality='high' allowfullscreen='true' allowscriptaccess='always' width='640' height='360' ><noembed><div><a href='http://www.omnisio.com">Share and annotate your videos</a>with Omnisio!</div></noembed></embed></object>

*FIG. 3G*

WEB-BASED SYSTEM FOR VIDEO EDITING

TECHNICAL FIELD

The disclosed embodiments relate generally to web-based editing, composition, and annotation of digital videos.

BACKGROUND

Conventional web-based systems permitting the storage and display of digital videos typically allow video playback and have some rudimentary tools for supplementing or altering the original video. These tools typically oblige a user to manually specify aspects such as time ranges during which a particular condition applies. Conventional systems also lack mechanisms for selecting video clips from a larger video and compositing the videos or video clips into a single compilation.

SUMMARY

The present invention includes web-based systems and methods for editing digital videos. A graphical editing interface allows designating one or more videos to assemble into a video compilation. The graphical editing interface further allows specifying the portion of a constituent video of the video compilation that will be displayed when the video compilation is played. The graphical editing interface additionally allows the association of annotations—specifying, for example, slides, people, and highlights—with portions of the video. The associated annotations alter the appearance of the video compilation when it is played, such as by displaying slides, or text associated with the annotations, along with the video at times associated with the annotations. The associated annotations also enhance the interactivity of the video compilation, such as by allowing playback to begin at points of interest, such as portions of the video for which there is an associated annotation. The associated annotations can be created by selection of annotation tools of the graphical editing interface, where at least one of the annotation tools is created responsive to a user providing information associated with the tool.

The features and advantages described in this summary and the following detailed description are not all-inclusive. Many additional features and advantages will be apparent to one of ordinary skill in the art in view of the drawings, specification, and claims presented herein.

BRIEF DESCRIPTION OF THE DRAWINGS

FIGS. 3F-3G illustrate an example user interface used for publishing and sharing a video compilation, according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF DRAWINGS

Figure 1:
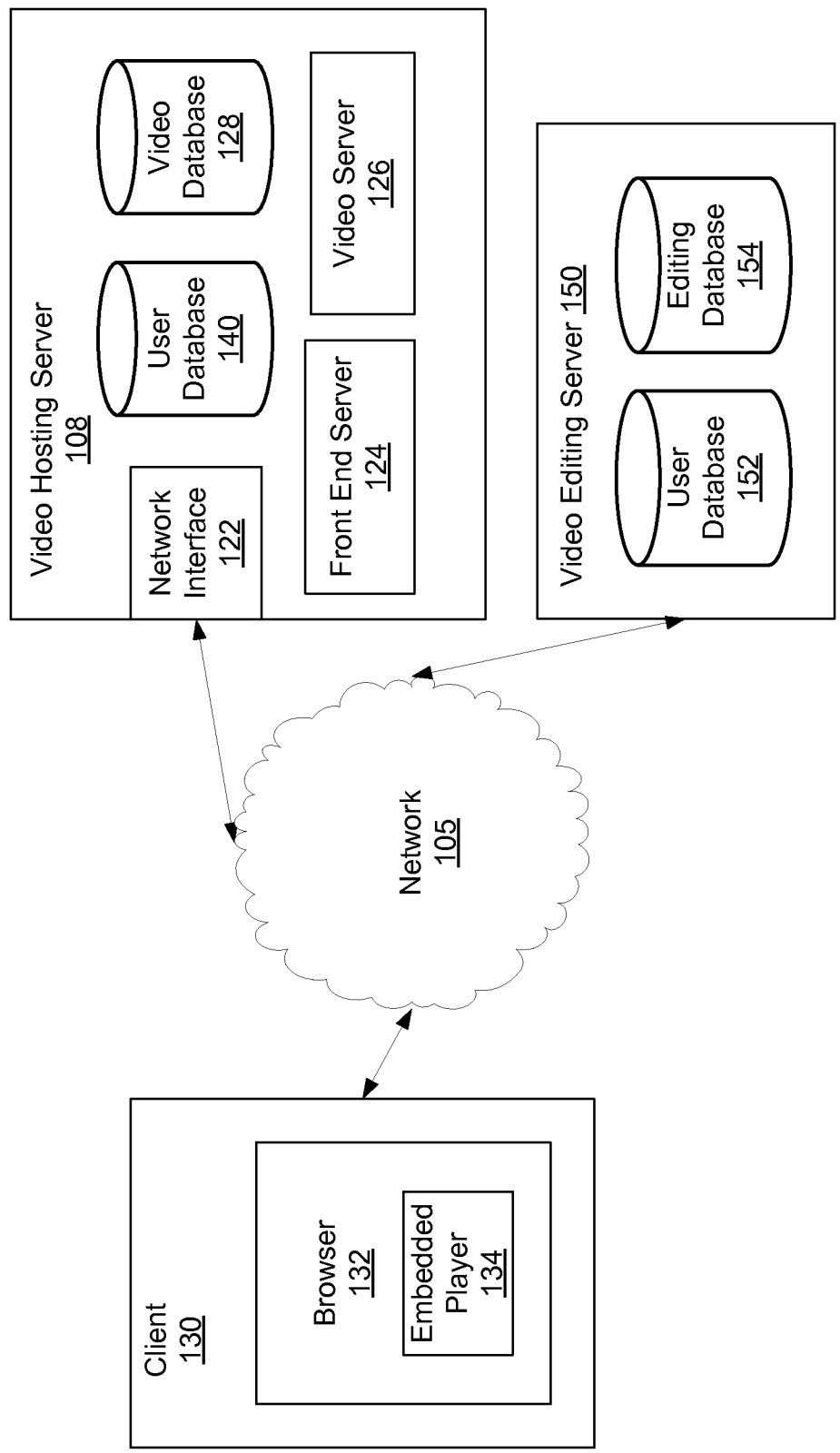
FIG. 1 is a block diagram of a system architecture, according to one embodiment.

FIG. 1 is a block diagram of a system architecture in accordance with one embodiment. As illustrated in FIG. 1, a video hosting server 108 includes a front end server 124, a video server 126, a network interface 122, a video database 128, and a user database 140. Other conventional features, such as firewalls, load balancers, application servers, failover servers, site management tools, and so forth are not shown so as to more clearly illustrate the features of the system. Examples of a suitable video hosting server 108 for implementation of the system include the YouTube™ and Google Video™ websites; other video hosting sites are known as well, and can be adapted to operate according the teaching disclosed herein. It will be understood that the term "website" represents any system and method of providing content and is not intended to be limited to systems that support content provided via the Internet or the HTTP protocol. The various servers are conventionally implemented, whether as a single piece of software or hardware or as multiple pieces of software or hardware and can couple to the network 105 via the network interface 122. In general, functions described in one embodiment as being performed on the server side can also be performed on the client side in other embodiments if appropriate.

A client 130 executes a browser 132, and connects to the front end server 124 via a network 105, which is typically the Internet, but may also be any network, including but not limited to a LAN, a MAN, a WAN, a mobile, wired or wireless network, a private network, or a virtual private network. While only a single client 130 and browser 132 are shown, it is understood that very large numbers (e.g., millions) of clients are supported and can be in communication with the video hosting server 108 at any time. The client 130 may include a variety of different computing devices. Examples of client devices 130 are personal computers, digital assistants, personal digital assistants, cellular phones, mobile phones, smart phones or laptop computers. As will be obvious to one of ordinary skill in the art, the present invention is not limited to the devices listed above.

In some embodiments, the browser 132 includes an embedded video player 134 such as, for example, the Flash™ player from Adobe Systems, Inc. or any other player adapted for the video file formats used in the video hosting video hosting server 108. A user can access a video from the video hosting server 108 by browsing a catalog of videos, conducting searches on keywords, reviewing play lists from other users or the system administrator (e.g., collections of videos forming channels), or viewing videos associated with a particular user group (e.g., communities).

Video server 126 receives uploaded media content from content providers and allows content to be viewed by client 130. Content may be uploaded to video server 126 via the Internet from a personal computer, through a cellular network from a telephone or PDA, or by other means for transferring data over network 105 known to those of ordinary skill in the art. Content may be downloaded from video server 126 in a similar manner; in one embodiment media content is provided as a file download to a client 130; in an alternative embodiment, media content is streamed client 130. The means by which media content is received by video server 126 need not match the means by which it is delivered to client 130. For example, a content provider may upload a video via a browser on a personal computer, whereas client 130 may view that video as a stream sent to a PDA. Note also that video server 126 may itself serve as the content provider. Communications between the client 130 and video hosting server 108, or between the other distinct units of FIG. 1, may be encrypted or otherwise encoded.

Users of clients 130 can also search for videos based on keywords, tags or other metadata. These requests are received as queries by the front end server 124 and provided to the video server 126, which is responsible for searching the video database 128 for videos that satisfy the user queries. The video server 126 supports searching on any fielded data for a video, including its title, description, tags, author, category and so forth.

Users of the clients 130 and browser 132 can upload content to the video hosting server 108 via network 105. The uploaded content can include, for example, video, audio or a combination of video and audio. The uploaded content is processed and stored in the video database 128. This processing can include format conversion (transcoding), compression, metadata tagging, and other data processing. An uploaded content file is associated with the uploading user, and so the user's account record is updated in the user database 140 as needed.

For purposes of convenience and the description of one embodiment, the uploaded content will be referred to a "videos", "video files", or "video items", but no limitation on the types of content that can be uploaded are intended by this terminology. Each uploaded video is assigned a video identifier when it is processed.

The user database 140 is responsible for maintaining a record of all users viewing videos on the website. Each individual user is assigned a user ID (also referred to as a user identity). The user ID can be based on any identifying information, such as the user's IP address, user name, or the like. The user database may also contain information about the reputation of the user in the video context, as well as through other applications, such as the use of email or text messaging. The user database may further contain information about membership in user groups. The user database may further contain, for a given user, a list of identities of other users who are considered friends of the user. (The term "list", as used herein for concepts such as lists of authorized users, URL lists, and the like, refers broadly to a set of elements, where the elements may or may not be ordered.)

The video database 128 is used to store the received videos. The video database 128 stores video content and associated metadata, provided by their respective content owners. The video files have metadata associated with each file such as a video ID, artist, video title, label, genre, and time length.

A video editing server 150 provides the ability to create compilations from, and add annotation to, videos in the video database 128. The video editing server 150 has a user database 152 that maintains a record of all users using the video editing system. Each individual user is assigned a user ID (also referred to as a user identity). The user ID can be based on any identifying information, such as the user's IP address, user name, or the like. The user database 152 may also contain information about the reputation of the user in the video context. The user database may further contain information about membership in user groups. The user database may further contain, for a given user, a list of identities of other users who are considered friends of the user. (The term "list", as used herein for concepts such as lists of authorized users, URL lists, and the like, refers broadly to a set of elements, where the elements may or may not be ordered.) In an embodiment in which the video hosting server 108 and the video editing server 150 are implemented using the same server system, then the user database 140 and the user database 152 are implemented as a single database.

The video editing server 150 keeps a record of various user video editing actions, such as aggregating videos into a compilation, clipping videos to more restricted portions, annotating the videos with information about slides, people or events, adding popup visuals such as text boxes, and the like. It then stores these records within an editing database 154 in association with the user ID from the user database 152. The video editing server 150 also provides to entities such as the client 130 or the video hosting server 108, for a given video, records of editing actions stored within the editing database 154 for that video. In one embodiment, the video editing server 150 is on a separate physical server from the video hosting server 108, although in other embodiments the annotation functionality is included within the video hosting server 108. Video editing server 150 may be operated by the same entity that operates video hosting server 108, or may be a service provided by a third party, e.g., for a fee.

The editing database 154 stores information on video compilations, which are ordered collections of videos treated as a single composite video, and may include a single video. For example, editing database 154 stores in association with, e.g., a unique compilation identifier, an identifier of the user who created of the compilation, a total number of videos within the compilation, an identifier of each video to be played as part of the compilation, as well as an indicator (such as a time range) of the portion of each video to be played and an indicator of the order of the video within the compilation (such as "1" to indicate the first video in the compilation ordering). The editing database also maintains an association between each annotation and the appropriate portion of the annotated video or video compilation. In one embodiment, for example, the editing database 154 stores an identifier of the annotation type (e.g., a text box, or an annotation corresponding to a person) along with any information associated with that type (e.g., a text caption, or an ID corresponding to the person), a time stamp(s) of the portion of the video or compilation to which the annotation applies (e.g., from time 01:05 to time 01:26), an identifier of the video which the annotation annotates, and an identifier of a user who submitted the annotation (e.g., the user ID from the user database 152). Many other storage implementations for annotations would be equally possible to one of skill in the art.

Figure 2:
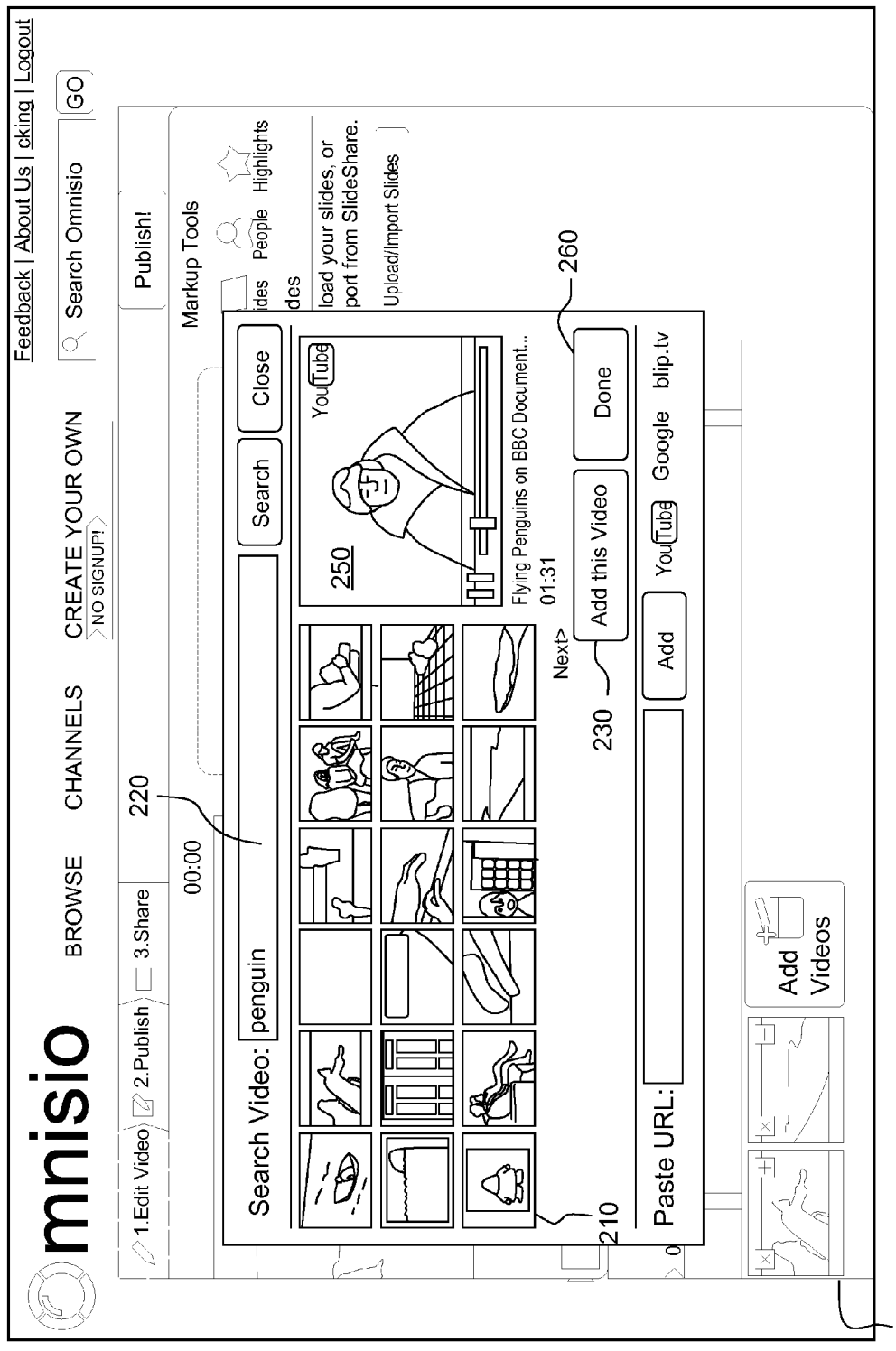
FIG. 2 illustrates an example user interface for specifying the videos to be included in the compilation, according to one embodiment.

FIG. 2 illustrates an example user interface for specifying the videos to be included in the compilation, according to one embodiment. In region 210, a number of thumbnail representations of videos are displayed, in response to the entry of a query for videos specified in search area 220. Specifically, region 210 displays videos returned in response to the query "penguin" entered in search area 220. The query may locate videos from various sources, such as the video database 128. Alternatively, a video can be specified directly via an identifier, such as a URL of a video within the video database 128. A selected video is then displayed, e.g. via live video playback, in video region 250. Videos are then added to the compilation via, for example, the Add button 230. Videos currently added to the compilation are displayed in the region 240. Selection of the Done button 260 causes the process to proceed to the editing phase.

Figure 3A:
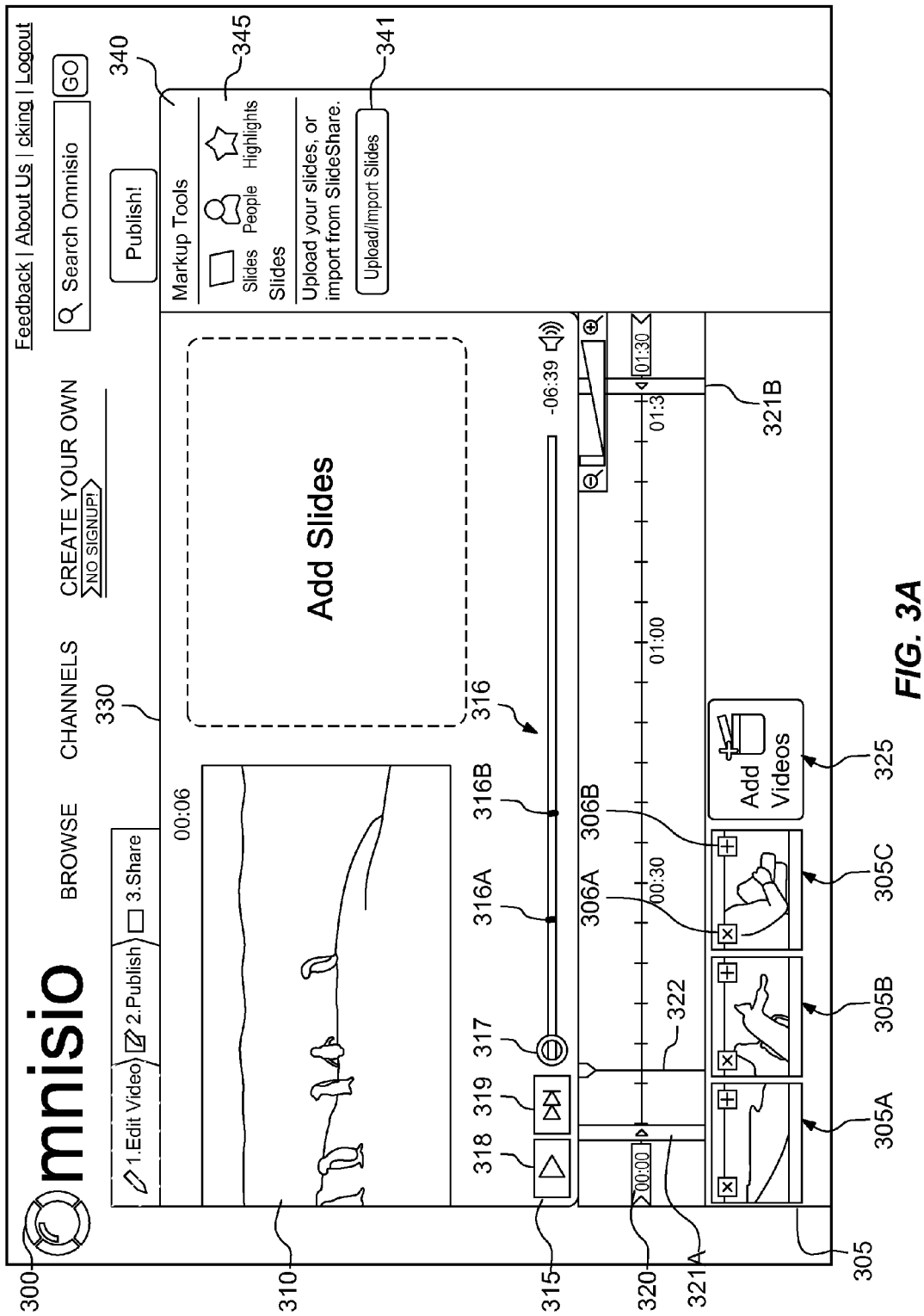
FIGS. 3A-3E illustrate an example user interface used for video editing, according to one embodiment.

FIG. 3A illustrates an example user interface 300 used during the editing phase, according to one embodiment. Videos in the video set 305 correspond to the videos selected via the interface of FIG. 2. In the example of FIG. 3A, the compilation includes three videos 305A-C, which are depicted using thumbnails representations of their content. Each video in the video set 305 has a remove button 306A and a duplicate button 306B; selection of the former removes the video from the video set 305, and selection of the latter creates a new, separate instance of the video and adds it to the video set 305. Selection of "Add Videos" button 325 redisplays the user interface of FIG. 2, which can be used to select additional videos. One of the videos—video 305A in the example of FIG. 3A—is visually distinguished, for example by use of a highlighted box or other characteristic to designate that it is the currently selected video, and is shown in playback area 310. The controls in playback control area 315 both control playback and display playback position within the set of selected videos. The play-pause button 318 is used to start and stop playback of the video. The scene seek button 319 allows a user to seek to the next "interesting" portion of the current video (or subsequent videos in the set of videos). As described further below, interesting portions include those with which annotation has been associated. The video segment bar 316 displays the relative lengths of each of the videos in the video set 305, with dividers 316A and 316B demarcating the boundaries of the videos. That is, dividers 316A and 316B divide the video segment bar 316 into three distinct portions, the length of each reflecting the relative lengths of the played portions of the videos 305. The thumb marker 317 displays the current playback location, including both the video that is being played and the location within that video. For example, the position of the thumb marker 317 in FIG. 3A indicates that the current playback location is near the beginning of the first of the three videos 305.

Timeline bar 320 represents the video currently being played, and thus corresponds to one of the segments on the video segment bar 316. The current time marker 322 indicates the current playback location within the current video, and thus corresponds to the thumb marker 317. The timeline bar 320 shows the times of the video currently being played, including the total length. In the example of FIG. 3A, the time interval labels listed on the timeline bar 320 indicate that the current video (the first video 305A, in the depicted example) has a length of approximately 1 minute and 30 seconds. Drag bars 321A and 321B indicate start and end times, respectively, for playback of the video. Thus, a user can drag the start drag bar 321A to some time after the beginning of the current video, and/or the end drag bar 321B to some time before the actual end of the video, and subsequent playback of the video will then begin and end at corresponding times. For example, referring to FIG. 3D, the start drag bar 321A has been dragged forward from time 0:00 to 0:08, and the end drag bar 321B has been dragged from time 1:30 back to time 0:45. Thus, when the video compilation is played back, the first video will start being played at time 0:08 and end at time 0:45, and the second and third videos will start and end at times according to their own drag bars 321, which are displayed when the videos have been made active. A video is made active either explicitly, such as by the user clicking on the corresponding thumbnail representation of the video 305, or implicitly, such as by playback of the video completing one video and proceeding to the next in sequence in the compilation.

The user interface 300 of FIG. 3A additionally provides the ability to associate slides and other types of annotation with the videos in the compilation. For example, annotation tools region 340 displays the available annotation tools within a tool selection region 345, which in the example of FIG. 3A includes slides, people, and highlights. Regarding the slides annotation, current slide region 330 of FIG. 3A indicates that no slides have yet been associated with the videos 305. Selecting region 330, or upload button 341, such as by clicking on them with the mouse, leads to the display of the user interface of FIG. 3B.

Figure 3B:
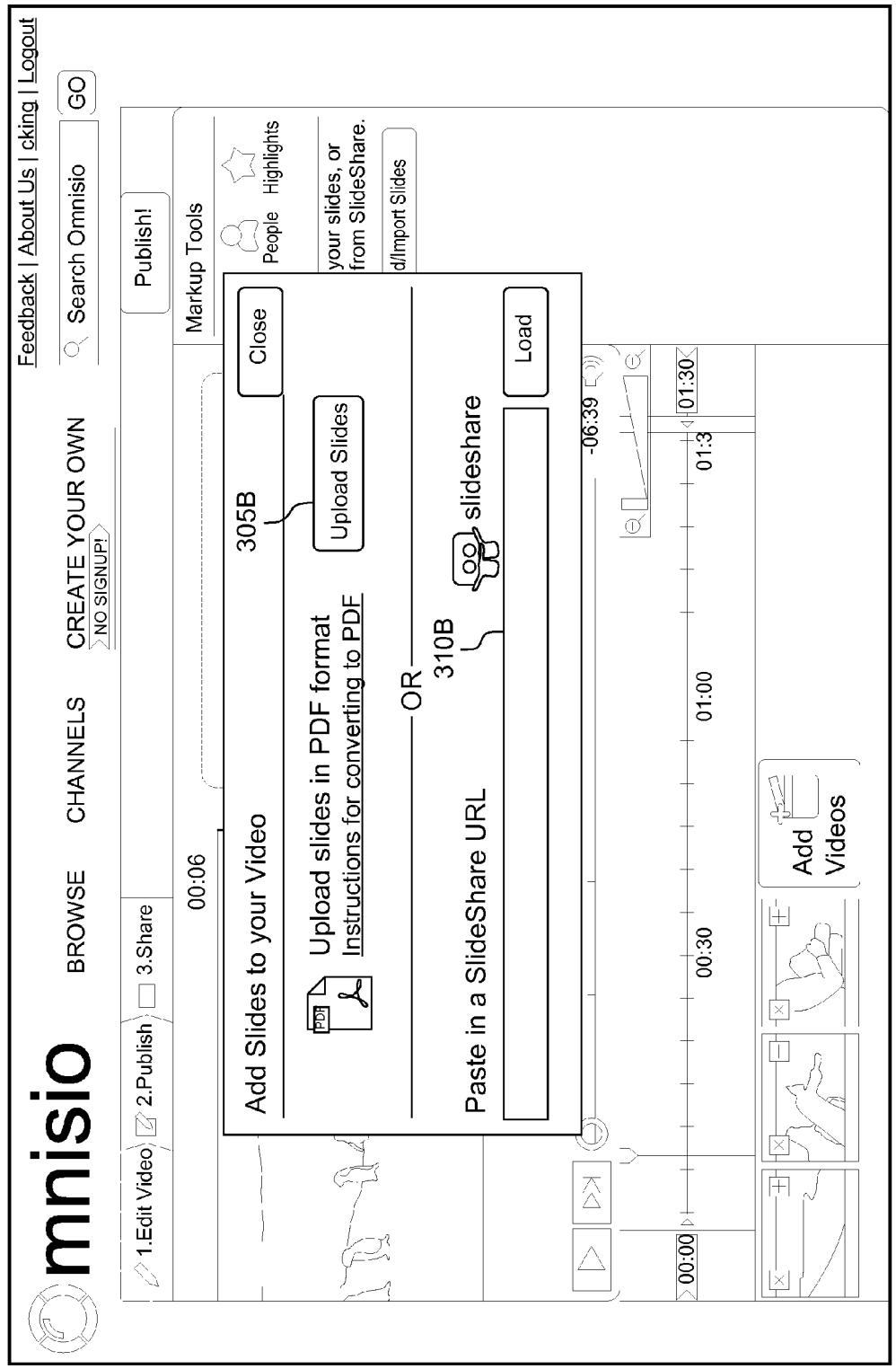

FIG. 3B depicts two ways of associating slides with the videos: by uploading a local file (in this case, a Portable Document Format (PDF) file) via selection of the upload button 305B, which leads to a standard file selection dialog box for specifying the file, or by specifying a URL in text box 310B. Although in the example of FIG. 3B the local file should be in PDF format, and the URL should correspond to a presentation hosted by the SLIDESHARE presentation hosting system, these options are merely for purposes of example, and in other embodiments other formats (e.g., PowerPoint) or presentation hosting systems may equally be employed.

Figure 3C:
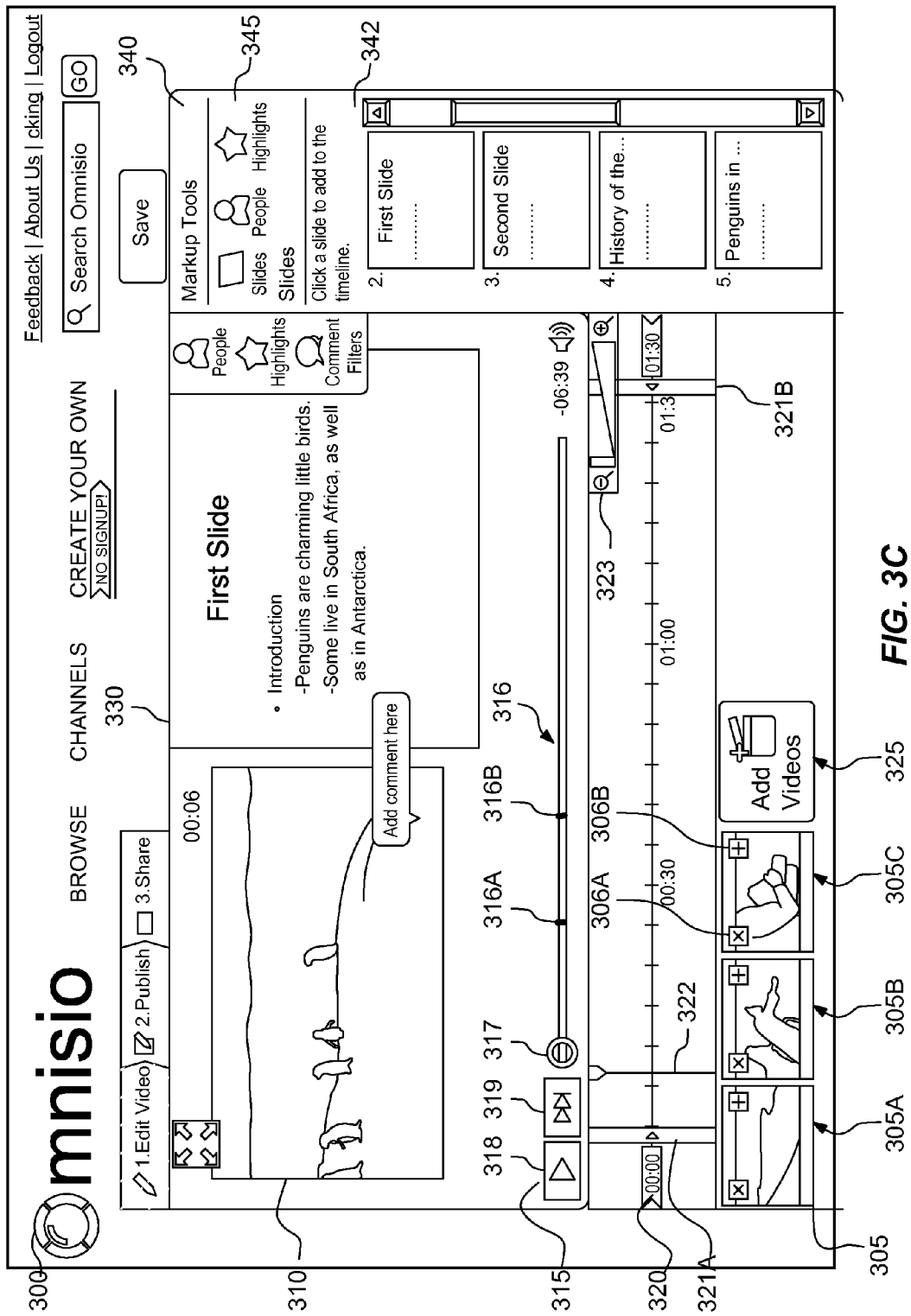

FIG. 3C depicts the user interface 300 after a presentation has been associated with the videos 305. The "Slides" icon of tool selection region 345 is highlighted to indicate that the slides annotation tool is the tool currently selected, the current slide region 330 now displays the first slide of the presentation, and slide representation region 342 displays a scrollable list of thumbnail representations of the slides in the presentation. Clicking on a slide thumbnail tool from region 342 associates that slide with the currently displayed portion of the video.

Figure 3D:
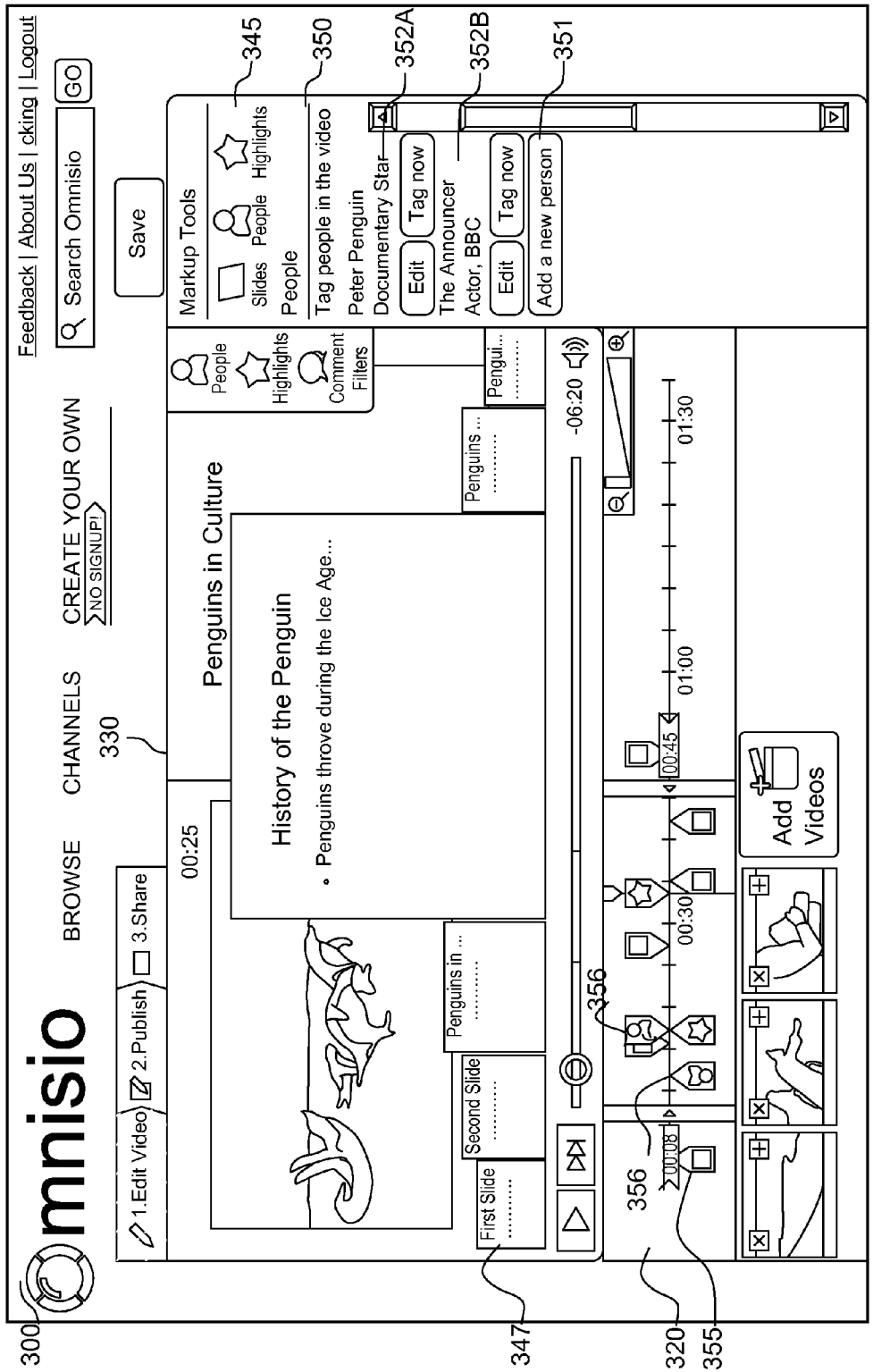

For example, FIG. 3D illustrates the user interface 300 after annotation has been associated with the videos 305. In particular, associated slides region 347 displays thumbnails of the slides from the region 342 of FIG. 3C. As more slides are added, the slide thumbnails within region 347 shrink so that all the slides are displayed at once. Thus, as more slides are added, the content of a given slide may become difficult to discern at smaller thumbnail sizes. In order to allow a user to view the contents of the slide thumbnails at a sufficiently large size to be viewable, the user interface 300 enlarges the thumbnails in response to the user indicating an interest in them, such as moving the mouse cursor over them. For example, in FIG. 3D, the user has moved the mouse cursor over the fourth slide ("History of the Penguin"), and the fourth slide (as well as its neighboring slides) has accordingly grown in size. Moving the mouse cursor away from the fourth slide will cause it (and its neighboring slides) to return to its normal smaller size.

FIG. 3D also depicts slide markers 355 (as illustrated, markers displaying rectangle icons) placed on the timeline 320 at timeline locations corresponding to the time within the video at which the slide was associated with the video. In one embodiment, a slide is associated with the portion of the video beginning with the time that the slide was associated, and ending with a time that the next slide was associated, or with the end of the video compilation (i.e., the end of the last video in the sequence of ordered videos in the compilation), if there is no next slide.

FIG. 3D further depicts user interface region 350 for defining annotation tools and adding annotation relating to people in the video. Selecting the "Add a new person" button 351 allows a user to specify data describing a person, such as the person's name and description. Once defined, an annotation tool for the person is added to a list within the region 350 and displayed to the user. For example, tools 352A and 352B respectively correspond to the person "Peter Penguin", described as a "Documentary Star", and "The Announcer", described as an actor with the BBC. Each of these tools 352 can be edited via its associated Edit button. Selecting a people tool's "Tag now" button creates an annotation for the person corresponding to that entry and associates it with the current time of the current video, including displaying a person tag at the corresponding locations on the timeline 320. For example, the timeline 320 of FIG. 3D displays two person tags 356, represented with icons depicting a person.

Figure 3E:
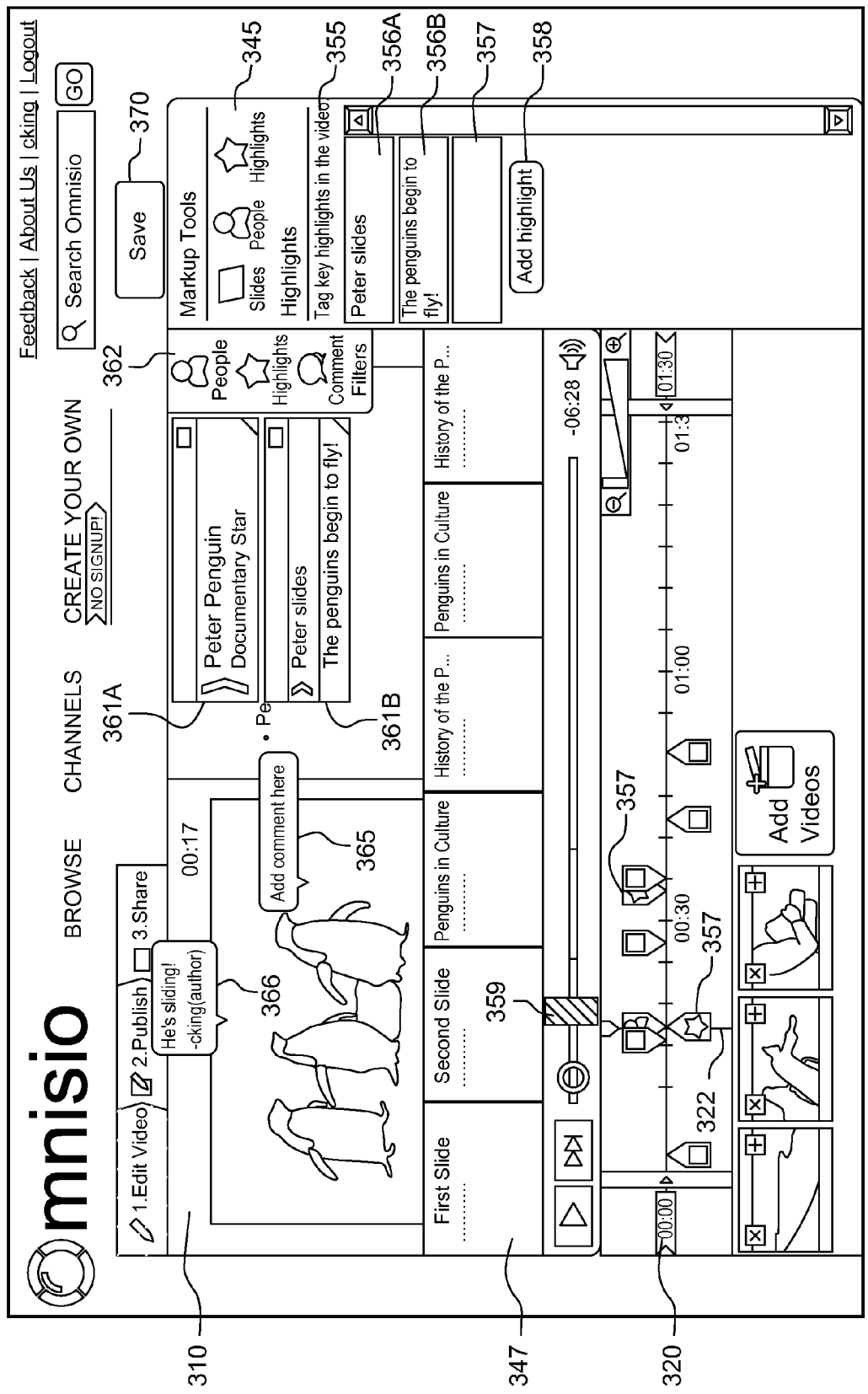

FIG. 3E illustrates the user interface 300 of FIG. 3C after the addition of annotation. In addition to the slide and people annotations depicted in FIG. 3D, FIG. 3E further depicts a user interface region 355 for adding annotation related to highlights in a video. For example, region 355 depicts two text field entries, "Peter slides" and "The penguins begin to fly!" corresponding to two previously specified highlights, as well as a current text field 357 for adding a new highlight. Selecting the button 358 creates a new highlight for the text within the current text field 357, associating it with the current time of the current video of the compilation and creating a marker tag at the corresponding time on the video. For example, FIG. 3E illustrates two highlight marker tags 357, depicted with star icons, indicating the highlights 356A and 356B.

FIG. 3E further depicts a user interface for selectively viewing the video compilation so as to focus on particular people or events. Selecting the icons 362 toggles display of their associated menus. For example, selecting the "People" or "Highlights" icons within icon set 362 causes menus 361A and 361B to appear or disappear, respectively. Menus 361 display the people and highlights annotations, respectively, with which videos of the video compilation have been annotated. For example, menu 361A contains an item for "Peter Penguin", the only people annotation that has been added to the compilation. Each selection of the "Peter Penguin" item causes video playback to begin at the next video portion (following the position indicated by the current time marker 322) previously associated with the corresponding people tag. Similarly, menu 361B contains a list of each highlight with which the video compilation has been tagged, the selection of any of which will cause playback of the video compilation at the corresponding time.

FIG. 3E additionally depicts displaying an indication of a region to which an annotation corresponds before a user causes playback to begin at the portion of the video corresponding to that annotation. Specifically, indicator 359 is located on the video segment bar 316, its horizontal start and end positions indicating start and end times of a portion of the video to which the annotation applies. The indicator 359 can appear in response to a variety of events, such as hovering the mouse pointer over a visual representation of the annotation, such as an entry for annotations in menus 361, a slide displayed in associated slides region 347, or one of the annotation tags on timeline 320. Moving the mouse pointer away from the visual representation of the annotation then causes the indicator 359 to disappear.

FIG. 3E also depicts the addition of textual comments to the video compilation. For example, moving the mouse cursor over the video playing in the video playback region 310 causes a prompt 365 to be displayed at the location of the mouse cursor. Responding to the prompt, e.g. by clicking the mouse at the current location, causes display of a text box entry area allowing the user to comment on the current portion of the video. For example, resulting comment area 366 displays a comment "He's sliding!" entered by the author of the video.

Any of the annotations displayed on the timeline 320— e.g., slide, people, and highlight tags—can be associated with different portions of the video compilation by dragging their tag icons 355-357 to a different location on the timeline. Similarly, the annotations may be removed entirely by dragging their icons off the timeline, selecting them and pressing the "Delete" key, or the like.

Figure 3F:

The resulting video compilation may then be saved, e.g. via the Save button 370, and published to the Internet. Related information, such as compilation title, compilation description, compilation tags (e.g. for finding the compilation as part of a search), whether the compilation is private to the author or also available to the public, and whether users other than the author can provide comments, can also be specified as part of publishing, e.g. as depicted in the sample user interface of FIG. 3F. The compilation can also be shared, such as with users of social networking sites, as depicted in FIG. 3G.

During video playback, either while the video is being edited, or during post-publication viewing, any previously-specified annotations are displayed and can be used to alter the flow of control of the video compilation. For example, any slides that were associated with the video compilation are displayed within the associated slides region 347 of FIG. 3D, the current slide being visually distinguished from the others (e.g., with an orange highlight) and also displayed in the current slide region 330. Selecting a slide thumbnail within the associated slides region 347 causes video playback to begin at the point in time associated with that slide. Likewise, selecting a people or highlights tag from menus 361 causes video playback to begin at the highlight, or at the next instance of the people tag, if any. Additionally, as the video plays, the text associated with any of the markup tags or comments is displayed along with the video at the times of the video at which the tags/comments were specified. For example, comments (such as the comment area 366 of FIG. 3E), the name of a people tag entry (e.g. "Peter Penguin"), and the title of an event (e.g. "Peter slides") are displayed along with the video, such as over top of the playing video, or adjacent to it, for some given time period, e.g. 3 seconds.

It is appreciated that the exact components and arrangement thereof, the order of operations, and other aspects of the above description are purely for purposes of example, and a wide variety of alternative component arrangements and operation orders would be equally possible to one of skill in the art. For example, the video editing server 150 of FIG. 1 could be part of the video hosting server 108, a server on the same local network as the video hosting server, or on a remote network from the video hosting server. As another example, the authentication server 170 could be separate from the video hosting server, or could be a component thereof. Further, some clients 130 could be configured not to communicate with the annotation server 150, or the video editing server 150 not to provide annotations to the client 130, in which case the client 130 obtains un-annotated video (e.g. clients in each country or language can have their own set of annotations). In some embodiments, the client 130 can perform annotation offline, without a network connection to the annotation server 150, and later synchronize the annotations with the video editing server 150 when a network connection becomes available.

Figure 4:
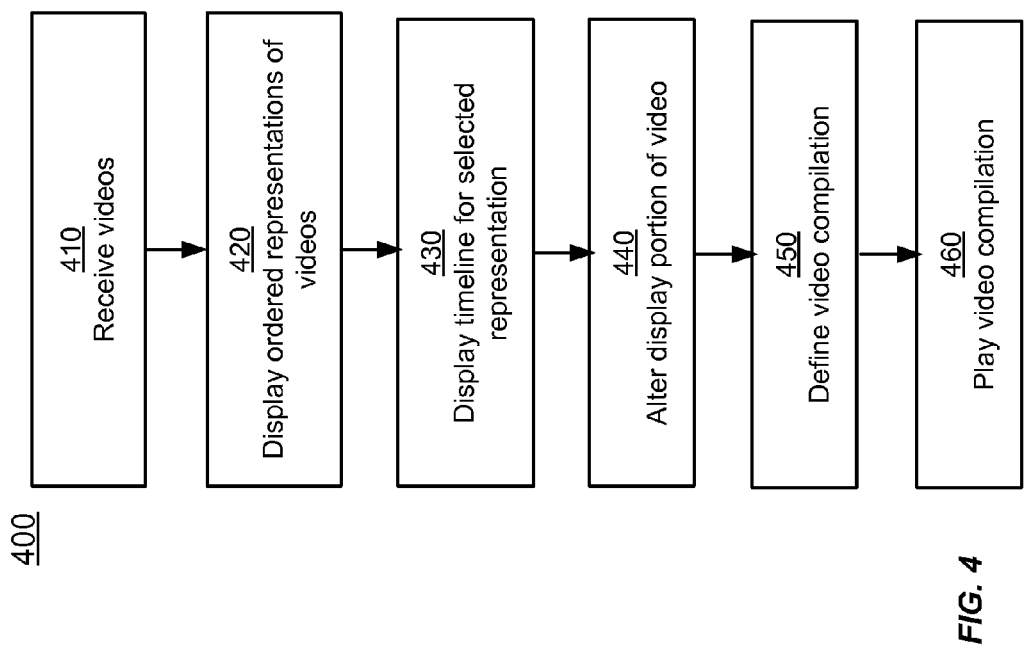
FIG. 4 illustrates the steps involved in defining and playing video compilations, according to one embodiment.

FIG. 4 illustrates the steps involved in defining and playing video compilations, according to one embodiment. First, videos are received 410, e.g. after a user selects the videos to include in the compilation via the user interface of FIG. 2. These received videos make up the video compilation. Ordered representations of the videos are then displayed 420. For example, the thumbnail representations 305 of FIG. 3A constitute one such ordered representation, the thumbnail representations being arranged in an order specified by a user, such as the order in which the videos were added using the user interface of FIG. 2, or a new order resulting from the user dragging the thumbnail representations into a new order. A timeline, such as timeline 320 of FIG. 3A, is then displayed 430 responsive to a selection of one of the representations 305. The timeline comprises start and end drag bars 321 corresponding to start and end times of a display portion of the video to display during video playback. When the user changes the position of the start or end drag bars 321, this alters 440 the start or end time of the display portion. For example, advancing the start drag bar 321 causes the video, when played, to begin at a later point. The result of the prior actions defines 450 a video compilation comprising the display portions of the videos specified by the start and end drag bars 321, where the display portions are ordered according to the corresponding ordered representations of the plurality of videos, e.g. the thumbnail representations 305 depicted in FIG. 3A. The video compilation can then be played 460, where the display portions of the videos are played in the order of their respective videos, and the non-display portions are omitted from playback.

Figure 5:
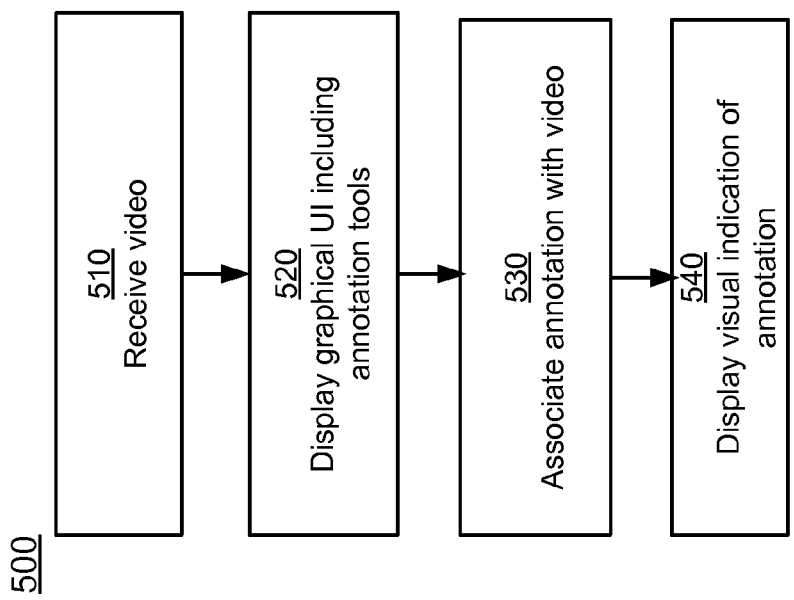
FIG. 5 illustrates the steps involved in annotating a digital video, according to one embodiment.

FIG. 5 illustrates the steps involved in annotating a digital video, according to one embodiment. First, a video is received 510, e.g. after a user selects a video via the user interface of FIG. 2. A graphical user interface is then displayed 520, the graphical user interface including the video, a timeline associated with the video, and annotation tools. For example, the user interface 300 of FIG. 3D displays people annotation tools 352A and 352B. At least one of the annotation tools is created responsive to a user providing information associated with the tool, such as a user selecting the "Add a new person" button 351 of FIG. 3D and specifying the name and description of a new person, leading to the creation of tools such as 352. Likewise, the slide thumbnail tools of region 342 of FIG. 3C are created responsive to the user specifying a slide presentation (e.g., via the user interface of FIG. 3B) from which to create the slide thumbnail tools. An annotation is then associated 530 with a portion of the video responsive to selection by the user of one of the annotation tools. For example, if a user selects a slide annotation tool, a corresponding slide annotation is created and associated with a portion of the video starting at the current playback time of the video and ending at the beginning of the next slide annotation, or at the end of the video or video compilation, if there is no such next slide annotation. A visual indication of the annotation is additionally displayed on the timeline 320 at a location corresponding to the first portion of the video. For example, FIG. 3E depicts a visual indication in the form of highlight annotation tag 357 added on the timeline 320 at a location corresponding to the current time of the video, as indicated by the current time marker 322. These various visual indications can further be moved along the timeline to associate their respective annotations with different portions of the video, dragged off the timeline to remove them, and the like.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method for annotating a digital video, the method comprising:
   receiving a selection of a set of digital videos to include in a compilation;
   accessing a video from the set of digital videos;
   displaying in a graphical user interface:
      indicia of each of the videos in the set of videos,
      a video segment bar to reflect relative lengths of each video in the set of videos,
      a timeline associated with the accessed video, and
      a tools selection region;
   accessing using the graphical user interface, a slide to include in the compilation; and
   responsive to accessing the slide:
      activating a slide annotation tool to make a slide annotation, the slide annotation tool included in the tools selection region,
      associating the slide annotation corresponding to the slide with a first portion of the accessed video, the first portion of the accessed video corresponding to a currently displayed portion of the accessed video, and
      displaying an iconic representation of the slide annotation at a location on the timeline corresponding to the first portion of the accessed video.

2. The computer-implemented method of claim 1, further comprising:

displaying in the graphical user interface a visual representation of the associated slide; and responsive to a selection of the representation of the associated slide, causing playback of the compilation starting at the first portion of the accessed video.

3. The computer-implemented method of claim 1, further comprising:

displaying in the graphical user interface a scene seek control;

wherein selection of the scene seek control causes playback of the accessed video starting at a next portion of the accessed video, the next portion of the accessed video being the first portion of the accessed video that occurs after a currently displayed portion of the accessed video and that has an associated slide annotation.

4. The computer-implemented method of claim 1, further comprising associating the slide annotation with a second portion of the accessed video responsive to a movement of the iconic representation of the slide annotation to a location on the timeline corresponding to the second portion of the accessed video.

5. A computer system for annotating a digital video, the system comprising:

an editing database storing user editing actions applied to a compilation; and a processor configured to execute instructions performing actions comprising:

providing a browser-based user interface to a client, the user interface including:

a indicia of each of a set of digital videos to include in the compilation, a video segment bar to reflect relative lengths of each video in the set of videos, a timeline associated with an accessed video from the set of digital videos, and a tools selection region;

accessing using the browser-based user interface, a slide to include in the compilation; and responsive to accessing the slide:

activating a slide annotation tool to make a slide annotation, the slide annotation tool included in the tools selection region, associating the slide annotation corresponding to the slide with a first portion of the accessed video, the first portion of the accessed video corresponding to a currently displayed portion of the accessed video, storing in the editing database the slide annotation in association with an indication of the first portion of the accessed video, and providing, at a location on the timeline of the provided browser-based user interface, an iconic representation of the slide annotation at a location on the timeline corresponding to the first portion of the video.

6. The computer system of claim 5, the actions performed by the instructions further comprising:

receiving from the client an identifier of a presentation; and providing, within the tools region of the provided browser-based user interface, a plurality of slide tools, each slide tool comprising a visual representation of the slide from the presentation;

wherein the selected tool is one of the slide tools and the associated annotation is the slide annotation.

7. The computer system of claim 5, the actions performed by the instructions further comprising:

providing, within the provided browser-based user interface, a scene seek control;

wherein client selection of the scene seek control causes playback of the accessed video starting at a next portion of the accessed video, the next portion of the accessed video being the first portion of the accessed video that occurs after a currently displayed portion of the accessed video and that has an associated slide annotation.

8. The computer system of claim 5, the actions performed by the instructions further comprising:

storing the slide annotation in association with a second portion of the accessed video responsive to receiving a notice indicating movement of the iconic representation of the slide annotation to a location on the timeline corresponding to the second portion of the accessed video.

9. A non-transitory computer-readable storage medium storing a computer program executable by a processor for annotating a digital video, actions of the computer program comprising:

providing a browser-based user interface to a client, the user interface including:

indicia of each of a set of digital videos to include in the compilation, a video segment bar to reflect relative lengths of each video in the set of videos, a timeline associated with an accessed video from the set of digital videos, and a tools selection region;

accessing responsive to an input received by the browser-based user interface, a slide to include in the compilation; and responsive to accessing the slide:

activating a slide annotation tool to make a slide annotation, the slide annotation tool included in the tools selection region, associating the slide annotation corresponding to the slide with a first portion of the accessed video, the first portion of the accessed video corresponding to a currently displayed portion of the accessed video, and providing, at a location on the timeline of the provided browser-based user interface, an iconic representation of the slide annotation at a location on the timeline corresponding to the first portion of the accessed video.

10. A computer system for annotating a digital video, the system comprising:

an editing database storing user editing actions applied to a compilation; and a processor configured to execute instructions performing actions comprising:

providing a browser-based user interface to a client, the user interface including:

indicia of each of a set of digital videos to include in the compilation, a video segment bar to reflect relative lengths of each video in the set of videos, a timeline associated with an accessed video from the set of digital videos, a tools selection region;

a scene seek control, wherein client selection of the scene seek control causes playback of the accessed video starting at a next portion of the accessed video, the next portion of the accessed video being the first portion of the accessed video that occurs after a currently displayed portion of the accessed video and that has an associated slide annotation;

receiving from the client an identifier of a presentation, the identifier associated with a set of slides that form the presentation;

providing, within the tools region of the provided browser-based user interface, a plurality of slide tools, each slide tool comprising a visual representation of a slide from the presentation; and responsive to application of the slide annotation tool:
  storing in the editing database a slide annotation in association with an indication of a portion of the video corresponding to a current time of the video, and
  providing, at a location on the timeline of the provided browser-based user interface, an iconic representation of the slide annotation at a location on the timeline corresponding to the portion of the video; and storing the slide annotation in association with a second portion of the video responsive to receiving an indication that the user moved the iconic representation of the slide annotation to a location on the timeline corresponding to the second portion of the video.

\* \* \* \* \*